(No Model.) 2 Sheets—Sheet 1.
S. BASSINGER.
ANIMAL TRAP.
No. 448,313. Patented Mar. 17, 1891.
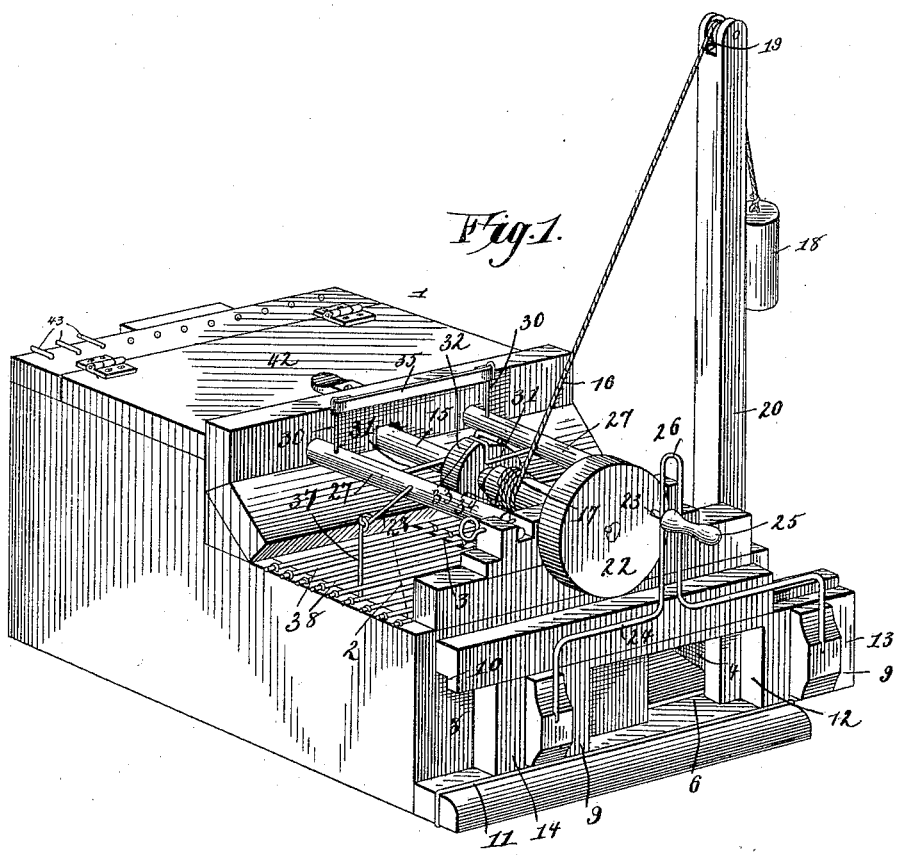
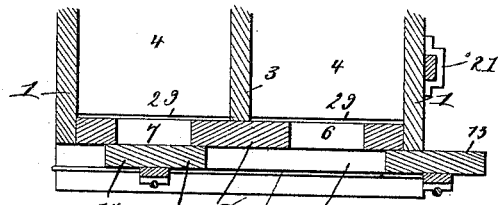
Witnesses
H. G. Dieterich
H. F. Riley
Inventor
Stephen Bassinger,
By his Attorneys,
C. A. Snow & Co.

(No Model.) 2 Sheets—Sheet 2.

S. BASSINGER.
ANIMAL TRAP.

No. 448,313. Patented Mar. 17, 1891.

Witnesses
H. S. Dieterich
N. J. Riley

Inventor
Stephen Bassinger,
By his Attorneys,
C. A. Snow & Co.

UNITED STATES PATENT OFFICE.

STEPHEN BASSINGER, OF ITALY, TEXAS, ASSIGNOR OF ONE-HALF TO W. D. MORTON, OF SAME PLACE.

ANIMAL-TRAP.

SPECIFICATION forming part of Letters Patent No. 448,313, dated March 17, 1891.

Application filed December 3, 1890. Serial No. 373,437. (No model.)

*To all whom it may concern:*

Be it known that I, STEPHEN BASSINGER, a citizen of the United States, residing at Italy, in the county of Ellis and State of Texas, have invented a new and useful Animal-Trap, of which the following is a specification.

The invention relates to improvements in self-set and ever-set traps.

The object of the present invention is to provide for catching small animals in a trap which will be ever set and in operative position for catching an animal and which will be automatically reset.

The invention consists in the construction and novel combination and arrangement of parts hereinafter fully described, illustrated in the accompanying drawings, and pointed out in the claims hereto appended.

Figure 2:
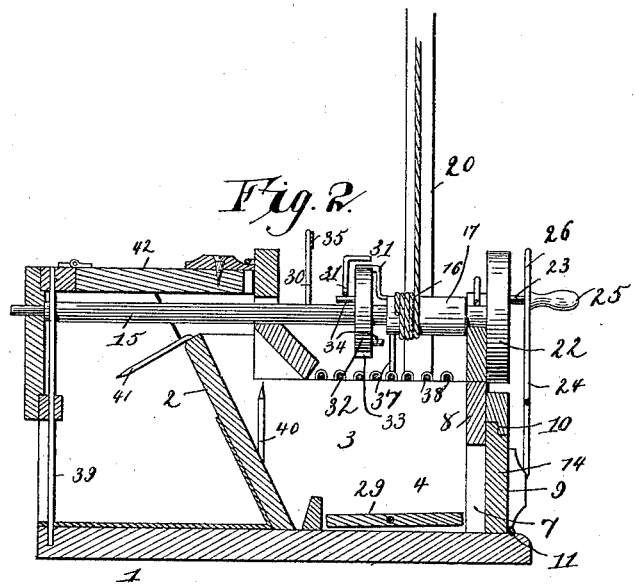
Figure 3:
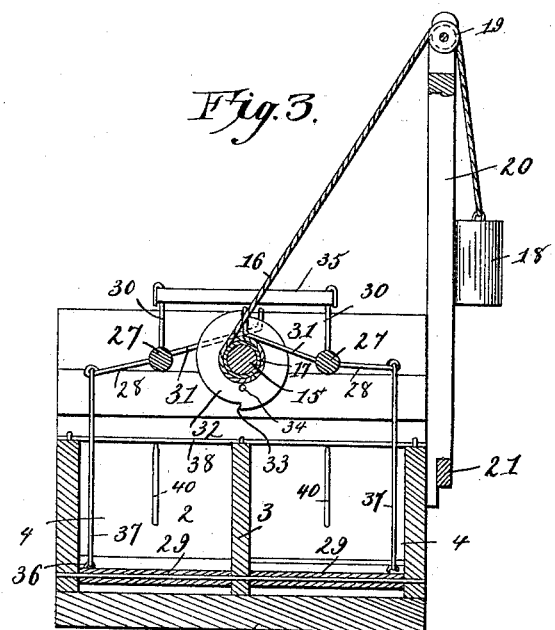

In the drawings, Figure 1 is a perspective view of an animal-trap constructed in accordance with this invention. Fig. 2 is a longitudinal sectional view. Fig. 3 is a transverse sectional view. Fig. 4 is a horizontal sectional view of the front of the trap.

Referring to the accompanying drawings, 1 designates a body or frame which is divided by an inclined transverse partition 2 into a rear portion or cage and a front portion or trap, and the latter portion is divided by a longitudinal partition 3 into two compartments 4 and 5, to which communication is had by openings 6 and 7, arranged in the front 8 of the body or frame and adapted to be alternately closed by a sliding door 9, whereby when one compartment is closed the other one will be open, and vice versa, thereby providing a trap which is continually set. The sliding door 9 is arranged in suitable ways formed by a grooved strip 10 and a rod 11, and it is provided intermediate its ends with an opening 12, which forms end portions 13 and 14, adapted by the sliding of the door to close alternately the openings 6 and 7 of the front of the frame to confine an animal in one of the compartments 4 and 5 and to open the entrance to the other compartment and adapt the lattter for the reception of an animal.

The door 9 is operated by a longitudinal shaft 15, which is journaled in the front and back of the frame or body and is arranged at the top of the same, and is rotated by a cord 16, having one end attached to and wound upon a drum 17 of the shaft 15, and the other end of the cord is provided with a weight 18. The cord passes over a pulley 19, journaled in the upper bifurcated end of an upright or post 20, the lower end of which is tenoned and seated in an opening of a bracket 21, secured to one side of the frame or body, and the said shaft 15 is rotated by the descending of the weight 18. The front end of the shaft carries a wheel 22, rigidly secured to the shaft and provided with an eccentrically-arranged wrist-pin 23, which engages a wire frame 24 of the sliding door and reciprocates the latter, and the said wrist-pin 23 is provided at its outer end with a handle 25, by means of which the shaft can be reversely rotated to wind up the weight, and the number of rotations of the shaft and the consequent reciprocation of the sliding door can be readily regulated by increasing or diminishing the fall of the weight 18 or the size of the drum 17.

The wire frame 24 is constructed of a single piece of wire having its end secured to the end portions 13 and 14 of the sliding door 9 and extended vertically and bent inward toward the middle of the sliding door, and then formed into a vertically-arranged loop 26, which is engaged by the wrist-pin and is retained in such engagement by the inner end of the handle 25.

Arranged on opposite sides of the shaft 15 are rock-shafts 27, provided with horizontally and outwardly projecting arms 28, connected with hinged bottoms 29 and having vertically-arranged arms 30, which are elastically connected to force inwardly-extending pawls 31 into engagement with a cam-wheel 32, mounted on the longitudinal shaft 15 and provided with diametrically-arranged cams 33, which are alternately engaged by the pawl 31 and which have a semi-rotation to cause a sliding of the door 9 to close one compartment and open the other. The ends of the pawls 31 are bent upward and horizontally and have the horizontal portions arranged to engage the periphery of the cam-wheel 33, and the latter is provided upon opposite sides with laterally-projecting pins 34, which are arranged slightly in advance of the cams 33 and are adapted to hold one of the pawls out of engagement with the adjacent cam and permit the other pawl to engage the same. The vertically-arranged arms 30 are connected by a rubber 35, which holds the pawls into engagement with the cam-wheel, and it will readily be seen that a spring might be employed to accomplish the same purpose, and I desire it to be understood that I do not limit myself to the precise details of construction herein shown and described, as I may without departing from the spirit of my invention make minor changes therein.

The hinged bottoms 29 are provided with staples or eyes 36, which are engaged by the lower ends of rods 37, connecting the hinged bottoms 29 with the horizontal arms 28 of the rock-shaft, and the said hinged bottoms are adapted to be depressed to turn the rock-shaft and carry the pawls out of engagement with the cam-wheel to cause a semi-rotation of the shaft 15 and produce a sliding of the door 9.

The top of the front portion or trap is formed by a series of wires 38, and the back 39 of the cage is similarly constructed of wire. The inclined bottom is provided on its front face with vertically-arranged points 40, upon which is hung the bait for the trap.

An animal after being confined in one of the compartments 4 and 5 will in endeavoring to escape climb up the inclined partition and enter the rear portion or cage, and the upper edge of the inclined partition is provided with a series of rearwardly-projecting points 41, which prevent the return of the animal. The top of the cage is provided with a hinged door 42, and by withdrawing the wires 43 the animal may be removed.

It will be readily seen that the trap is simple and comparatively inexpensive in construction, is continually set and is automatically reset, and is capable of catching a number of animals without requiring attention.

From the foregoing description and the accompanying drawings the construction, operation, and advantages of the invention will readily be understood.

What I claim is—

1. The combination, in an animal-trap, of the body or frame provided with two compartments, the sliding door to open and close alternately the compartments, the shaft 15, journaled in suitable bearings, the wheel 22, mounted on the shaft and provided with a wrist-pin connected with the sliding door and reciprocating the same, and means for rotating the shaft, substantially as described.

2. The combination, in an animal-trap, of the body or frame provided with two compartments, the sliding door alternately closing and opening the compartments, the wire frame 24, secured to the sliding door and provided with the vertically-arranged loop, the shaft 15, the wheel 22, mounted on the shaft and provided with a wrist-pin engaging said loop, and means for rotating the shaft, substantially as described.

3. The combination, in an animal-trap, of the body or frame provided with two compartments, the sliding door alternately closing and opening the compartments, the shaft, the wheel 22, mounted on the shaft and provided with a wrist-pin connected with and reciprocating the sliding door, the post or upright rising from the frame and provided with the pulley, and the cord having one end wound upon the shaft and passing over the pulley and having its other end provided with a weight, substantially as described.

4. The combination of the frame or body, the sliding door, the shaft connected with and reciprocating the sliding door, the cam-wheel mounted upon the shaft, the rock-shaft provided with pawls arranged to engage the cam-wheel, and the hinged bottoms connected with the rock-shafts, substantially as described.

5. The combination, in an animal-trap, of the frame or body, the sliding door, the shaft connected with and reciprocating the sliding door, the cam-wheel mounted on the shaft, the rock-shaft provided with pawls arranged to engage the cam-wheel and having the outwardly-extending arms 28, the hinged bottoms, and the rods connecting the hinged bottoms with said arms 28, substantially as described.

6. The combination, in an animal-trap, of the body, the sliding door, the shaft connected with and reciprocating the sliding door, the cam-wheel mounted upon the shaft, the rock-shafts provided with pawls to engage the cam-wheel and having the vertically-extending arms 30, the elastic connection between said arms 30, and the hinged bottoms connected with the rock-shafts, substantially as described.

7. The combination, in an animal-trap, of the body or frame, the sliding door, the shaft connected with and reciprocating the sliding door, the cam-wheel mounted upon the shaft, the rock-shafts provided with the upwardly-extending and elastically-connected arms 30 and having the pawls arranged to engage the cam-wheel, the pins 34, projecting laterally from the cam-wheel and arranged to engage the pawls, and the hinged bottoms connected with the rock-shafts, substantially as described.

8. The combination, in an animal-trap, of the body or frame provided with two compartments, the sliding door alternately opening and closing the compartments, the shaft, the wheel 22, mounted upon the shaft and provided with a wrist-pin connected with and reciprocating the sliding door, the post or upright rising from the frame and provided with a pulley, the cord passing over the pulley, having one end wound upon the shaft and having the other end provided with a weight, and a handle arranged upon the outer end of the wrist-pin to reversely rotate the shaft and wind up the shaft, substantially as described.

9. In an animal-trap, the combination of the frame or body provided with two compartments 4 and 5 and having openings 6 and 7, the sliding door arranged in suitable ways and provided with the central opening 12, forming end portions 13 and 14, the shaft 15, journaled in suitable bearings and connected with and reciprocating the sliding door, and means for rotating the shaft, substantially as described.

10. The combination, in an animal-trap, of the frame or body having the openings 6 and 7, the inclined partition dividing the frame or body into a rear portion or cage and a front portion or trap, the longitudinal partition 3, dividing the front portion into compartments 4 and 5, the sliding door having a central opening forming end portions 13 and 14, the shaft 15, journaled in suitable bearings, the wheel 22, mounted upon the shaft and provided with a wrist-pin connecting with and reciprocating the sliding door, the cam-wheel provided with diametrically-arranged cams, the rock-shaft arranged upon opposite sides of the shaft 15 and provided with the vertically and horizontally extending arms and having the pawls arranged to engage the cam-wheel, the hinged bottoms connected with the horizontally-extending arms, and means for rotating the shaft, substantially as described.

In testimony that I claim the foregoing as my own I have hereto affixed my signature in presence of two witnesses.

STEPHEN BASSINGER.

Witnesses:
E. M. FIELD,
ROBT. AYCOCK.